United States Patent [19]

White, Jr. et al.

[11] Patent Number: 5,185,882
[45] Date of Patent: Feb. 9, 1993

[54] BIT-SLICE MICROPROCESSOR TEST SYSTEM

[75] Inventors: Harvey H. White, Jr., Hampstead, Md.; Harry Boler, Shawnee, Kans.

[73] Assignee: Westinghouse Electric Corp., Pittsburgh, Pa.

[21] Appl. No.: 515,382

[22] Filed: Apr. 27, 1990

[51] Int. Cl.$^5$ .............................................. G06F 11/00
[52] U.S. Cl. ................................. 395/575; 364/267.2; 364/267.4; 364/DIG. 1; 371/16.1; 371/16.2
[58] Field of Search ............................ 371/16.1, 16.2; 395/575; 364/267.2, 267.4

[56] References Cited

U.S. PATENT DOCUMENTS

| | | | |
|---|---|---|---|
| 4,691,316 | 9/1987 | Phillips | 371/16.2 |
| 4,868,822 | 9/1989 | Scott et al. | 371/16.2 |
| 4,985,893 | 1/1991 | Gierke | 371/16.2 |
| 4,989,208 | 1/1991 | Akao et al. | 371/18 |

Primary Examiner—Charles E. Atkinson
Attorney, Agent, or Firm—John K. Williamson; Norman A. Nixon

[57] ABSTRACT

Test data is incorporated within the microcode of a bit-slice microprocessor to be used during development of the program to verify program performance and during operation of the program as a built-in test. Little additional hardware is required and there is minimal impact on the structure of the program. The program is allowed to operate with the same data that it would have when integrated with the system. During development, the embedded data is used as a substitute for the rest of the system, allowing program development to continue until system integration, using only power supplies and some test equipment. When implemented and used with a commercially available microprocessor ROM emulator, the test data may be varied to highlight difficulties in algorithm design and program development. The operating program cannot tell the difference between live system data and embedded test data. Thus, the program will behave identically during development and system operation. This allows complete algorithm debugging during program development, and permits the rest of the system to be developed in parallel. Developmental test data can be used later for operational program/hardware bit confidence testing with minimal changes.

11 Claims, 3 Drawing Sheets

BIT-SLICE MICROPROCESSOR TEST SYSTEM

BACKGROUND OF THE INVENTION

1. Field of the Invention

The present invention is directed to testing of computer software and, more particularly, to providing test data for software executed by a bit-slice microprocessor ordinarily operating on real-time data.

2. Description of the Related Art

Bit-slice microprocessors are small, fast processors with certain limitations. In applications of bit-slice microprocessors, program sequence control is separated from arithmetic processing. Systems using bit-slice microprocessors and microprogram sequencers are commonly used in a wide variety of real-time processing applications in place of hard-wired components to increase flexibility and decrease development time. For example, a single traffic control radar system may use 3 or more bit-slice microprocessors and microprogram sequencers.

One of the functions of air traffic control radar which has been performed by a bit-slice microprocessor is target correlation. The target correlator of the ARSR-3 traffic control radar used by the Federal Aviation Administration of the United States of America includes a bit-slice microprocessor (e.g., an INTEL 3000 or more recently an Advanced MicroDevices (AMD) 29117) operating on 80 bit wide microwords and a microprogram sequencer (an AMD 2910A with a pipeline register). An interrupt controller is used to interface the system with real time data input events. Included on the target correlator board is a 32K by 16 bit data memory (RAM) addressed through a preloadable counter. In normal operation, the data memory is addressed by loading the counter with an address, then presenting data to write to the memory or reading the data output from memory, as required Normal memory access hardware generates memory read and memory write strobes from a single write enable bit in a microcode instruction used to access the RAM.

A bit-slice microprocessor-based target correlator requires system targets and live data to function To make modifications to the target correlator, a method is required to provide simulated target and system data during development and debugging This method should use a minimum of additional hardware, and be capable of providing a high level confidence check of the target correlator during system diagnostic testing. One alternative is to generate the radar data using a simulator or recording of actual data. This requires additional, special purpose hardware which is either very expensive or difficult to use to obtain test data with the desired content. A second alternative is to write a program with "read constant" statements embedded in the program for each piece of data. This can require a lot of space in memory and space is typically limited in bit-slice microprocessor systems. In addition, a significant amount of code is required in the operational portion of the program to access the portion of the program containing test data.

SUMMARY OF THE INVENT

An object of the invention is to provide a method for storing simulated external system data to a program executing in a bit-slice microprocessor.

Another object of the present invention is to provide test data to a bit-slice microprocessor with as few modifications to normal operation of the bit-slice microprocessor as possible.

A further object of the present invention is to provide internal test data representing external system data to a bit-slice microprocessor using a minimal amount of code in the program to be tested.

Yet another object of the present invention is to provide a technique for testing a bit-slice microprocessor with as little additional hardware and software as possible.

Another object of the invention is to supply test data to a bit-slice microprocessor in such a manner that the test data can be easily modified to test system response to different patterns of data.

A yet further object of the present invention is to provide a method for testing a bit-slice microprocessor using internally stored data which is simple enough for a non-programmer to generate the test data and run the microprocessor on the test data.

The above objects are attained by a method of providing test data for a processing system having an arithmetic/logic unit and a sequence control unit executing a program stored in read only memory and storing data in random access memory, said method comprising the steps of storing test data as instructions for the arithmetic/logic unit in the program stored in read only memory; sequentially reading the instructions stored previously while the arithmetic/logic unit is prevented from receiving the instructions; sequentially storing the test data in the random access memory as the instructions are read; and accessing the test data in the random access memory in place of receiving operational data when the processing system is in a test mode.

These objects, together with other objects and advantages which will be subsequently apparent, reside in the details of construction and operation as more fully hereinafter described and claimed, reference being had to the accompanying drawings forming a part hereof, wherein like reference numeral refer to like parts throughout.

DESCRIPTION OF THE PREFERRED EMBODIMENT

Figure 1:
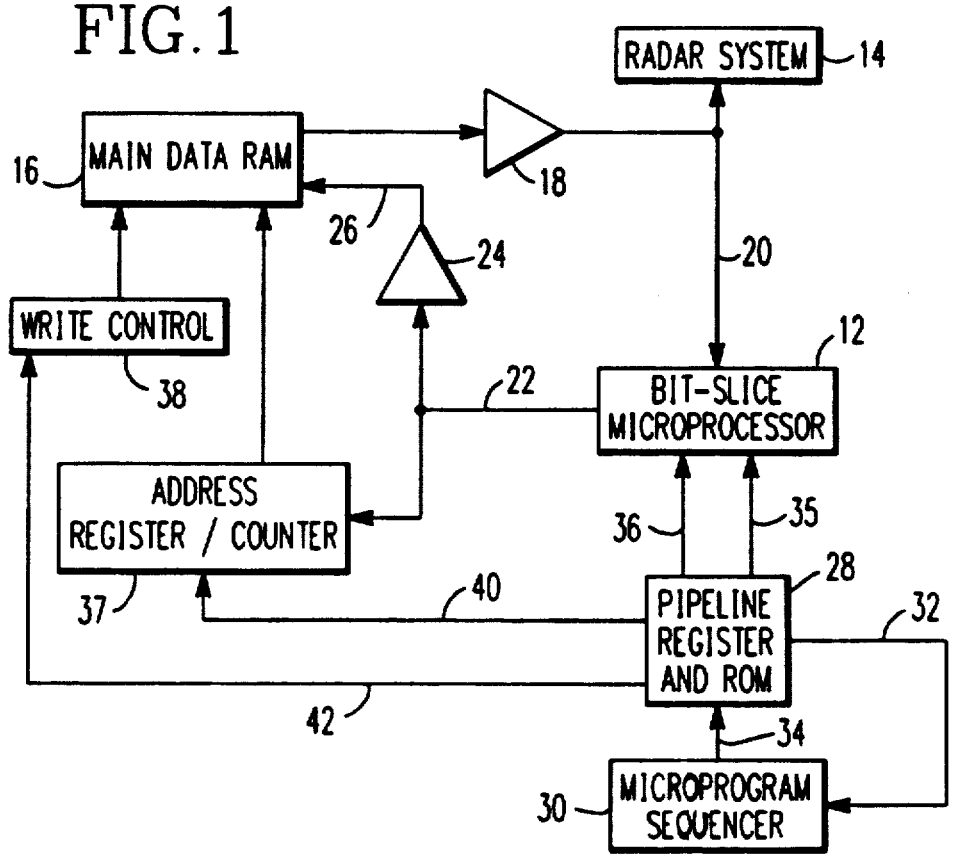
FIG. 1 is a simplified block diagram of a target correlator used in a traffic control radar system.

The present invention can be applied to bit-slice microprocessor systems used in many applications. As an example, the preferred embodiment will describe application of the present invention to a target correlator in a traffic control radar system such as the ARSR-3. A block diagram of the target correlator in the ARSR-3 is illustrated in FIG. 1.

During operation of the target correlator, an aritmetic/logic unit, such as a bit-slice microprocessor 12, in the target correlator receives data from other components of the radar system 14 and receives previously obtained and processed data from a main data RAM 16 via a buffer or gate 18. Both the data from the radar system 14 and the main data RAM 16 are input to the microprocessor 12 on data input line 20. Data is output from the microprocessor 12 on a data output line 22. The data is supplied to the main data RAM 16 via a buffer 24 on data input line 26.

The operation of the microprocessor 12 and the main data RAM 16 are controlled by a pipeline register and ROM unit 28. The ROM portion of the pipeline register and ROM unit 28 contains a program which controls the operation of the target correlator illustrated in FIG. 1. A portion of each instruction in the program stored in the ROM is supplied to a sequence control unit, such as a microprogram sequencer 30, via control line 32. The microprogram sequencer 30 provides timing and controls the order of execution of the program stored in the ROM by supplying the next address to be used on address line 34.

The program stored in the ROM contains microcode words having different portions that are supplied to different units in the target correlator. In the ARSR-3 target correlator, the microcode word contains 80 bits of which 16 bits contain an instruction for the microprocessor 12 which are supplied via instruction line 35. Another 10 bits are supplied on control line 36 to the microprocessor 12. The control line 32 supplies 16 bits of the microcode word to the microprogram sequencer 30. The remainder of the microcode word is supplied to the pipeline register in unit 28 and is used to control other units in the target correlator and the radar system 14.

The bits in the pipeline register control the operation of an address register/counter 37 and a write control unit 38. One of the bits in the pipeline register is used to produce a load signal on load control line 40 which when present causes the data output from the microprocessor 12 on data output line to be stored in the address register 35 Another of the bits in the pipeline register is used to generate a write signal on write control line 42 to control operation of the write control unit 38.

In a system like that illustrated in FIG. 1, the only source for new data is the radar system 14. While data can be output from the RAM 16 to the microprocessor 12 via buffer 18, the only way to store data in the RAM 16 is via the microprocessor 12 which supplies the data on data output line 22 to the RAM 16 via buffer 24. Thus, without making any modifications to the hardware or software of the target correlator illustrated in FIG. 1, the only way to supply test data is to replace the radar system 14 with a simulator or a recording of actual radar data. The former alternative requires expensive special purpose hardware and the latter alternative is limited in the types of data which can be presented to the target correlator.

Another alternative for providing test data to the target correlator illustrated in FIG. 1 is to modify the programs stored in the ROM of unit 28. A "read constant" instruction followed by the data to be read could be encoded into the program stored in the ROM, as indicated in Appendix A. However, with 80 bits in each word and two words required to read each 16 bits of data, 10 times as much program space (160 bits) is required for each piece of data (16 bits). Since a large amount of data, e.g., thousands of bits, are required for a significant test of the target correlator, an undesirably large amount of space would be required in the ROM of unit 28. Furthermore, substantial additional code is required to access the test data in the ROM, as indicated in the example in Appendix B.

From cost and testing flexibility standpoints, providing test data using software is preferable to any of the alternatives discussed above which replace the radar system 14 with a source of data. However, some method for reducing the amount of space required to store and access the data in the ROM is desirable. As discussed below, this can be accomplished by transferring data from the ROM 28 to the RAM 16.

According to the present invention, test data is stored in the ROM of unit 28 in one-half the amount of space required by a series of "read constant" statements. The present invention uses the structure illustrated in FIG. 2 to reduce the amount of space required in the ROM. The radar system 14 is not used during testing. Instead, the program stored in the ROM includes instructions for simulating the response to the radar system 14 to the extent necessary to test all operational portions of the program in test mode.

The target correlator system illustrated in FIG. 1 is modified to add an additional output line 44 which provides a data transfer path to carry the "instruction" output on line 35 from the pipeline register and ROM unit 28 to the microprocessor 12. The output line 44 is connected via a buffer 46 and output line 48 to the data input line 26 of the main data RAM 16. Thus, a single microcode word can be stored in the ROM of unit 28 which contains a bit that will be output on write line 42 to the write control unit 38 to store the "instruction" output from unit 28 on line 35 as test data in RAM 16.

Figure 3:
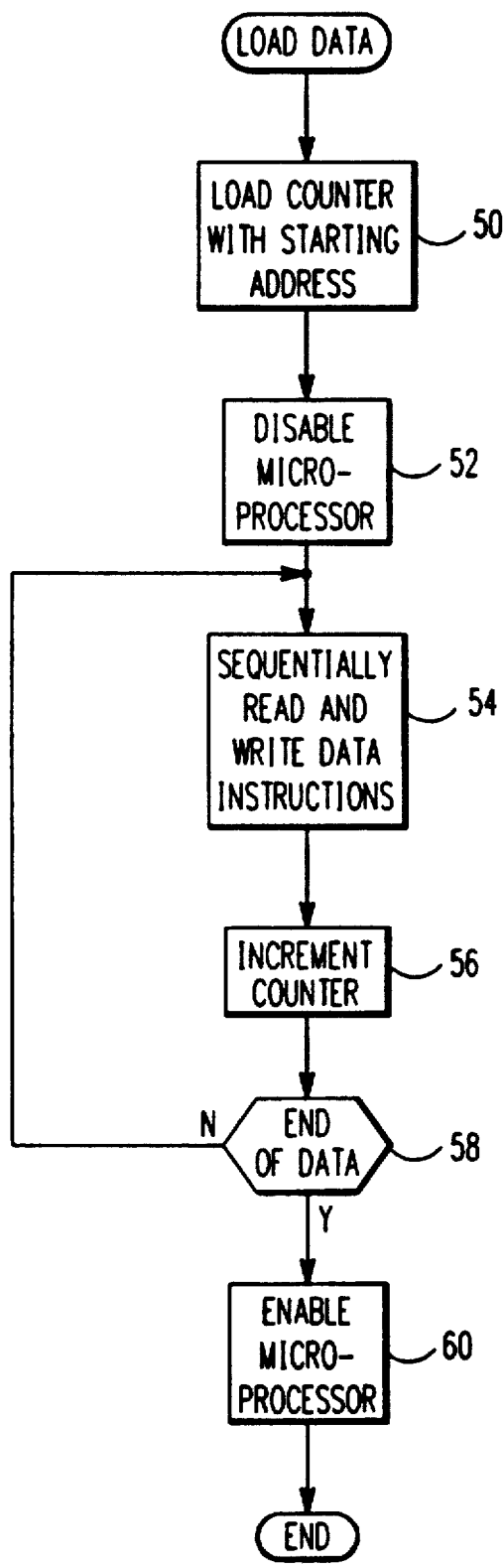
FIG. 3 is a flowchart of the operation of transferring test data from ROM to RAM in a bit-slice microprocessor system.

The procedure followed for loading data into the RAM 16 is illustrated in FIG. 3. First, the address register/counter 37 is loaded 50 with the starting address which is supplied to the bit-slice microprocessor 12. Then, the microprocessor 12 is disabled 52 to prevent the microprocessor 12 from attempting to execute the data output on line 35 as an instruction, by outputting a signal on control line 36. This ability to be temporarily disabled is a common feature of bit-slice microprocessors which is included in the AMD 29117.

The microprogram sequencer 30 then sequentially cycles through the microcode words in the ROM of unit 28. The microcode words read 54 from the ROM have the write control bit set for output on write line 42. The counter 37 is instructed to automatically increment 56 the address loaded therein. As a result, the dummy instruction output on line 35 and supplied to the RAM data input line 26 via lines 44 and 48 and buffer 46 are written 54 into a sequential address space, e.g., in the form illustrated in Appendix C. When the end of data 58 is reached, the microprocessor is again enabled 60. The starting address of the test data is stored in a pointer so that the program can locate the test data.

Figure 2:
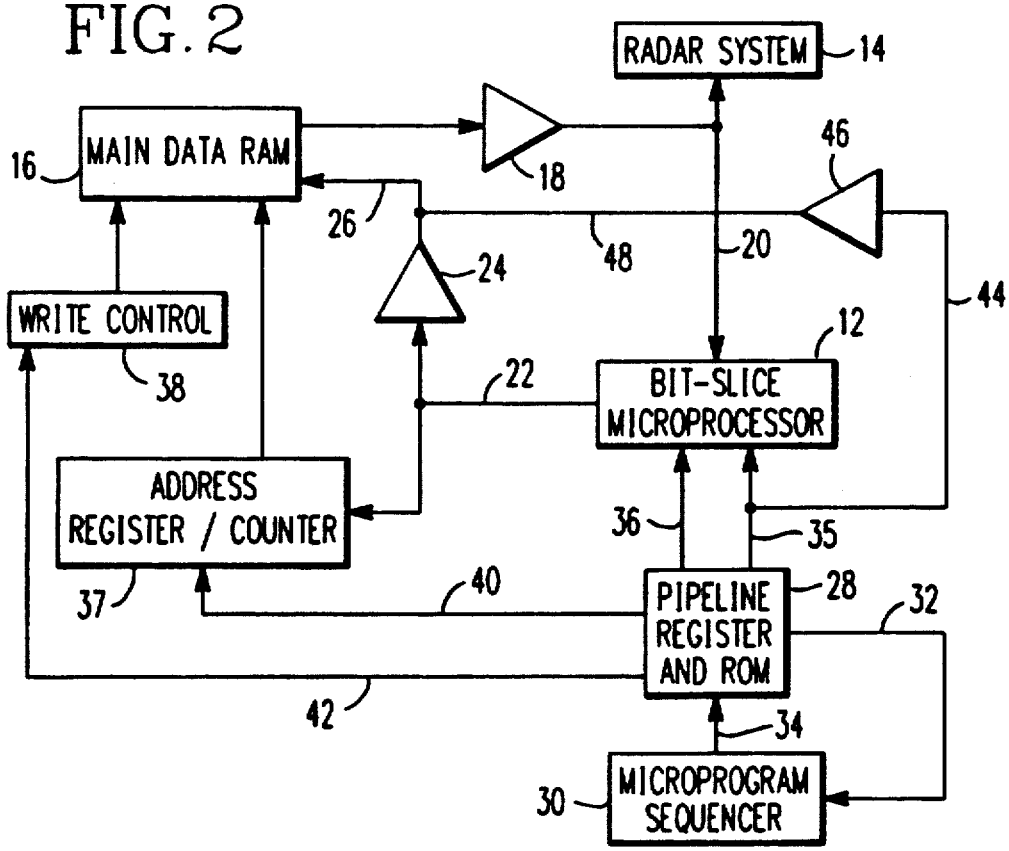
FIG. 2 is a simplified block diagram of the target correlator illustrated in FIG. 1 modified to operate on test data acccording to the present invention.
Figure 4:
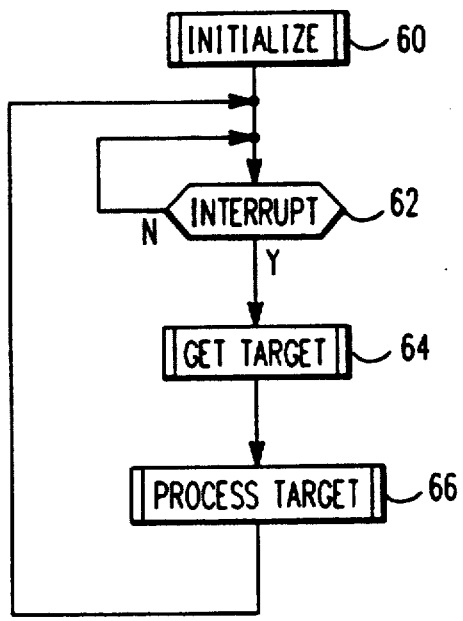
FIG. 4 is a flowchart of major functions performed by the target correlator illustrated in FIGS. 1 and 2.

The major functions performed by the target correlator illustrated in FIG. 2 are depicted in the flowchart illustrated in FIG. 4. When power is supplied to the target correlator, the system illustrated in FIG. 2 is initialized 60. The initialization step 60 may include the process of loading test data automatically into a portion of the RAM 16 using the method illustrated in FIG. 3. The program stored in the ROM of unit 28 then enters a state in which it continually checks 62 for interrupts. The test mode can be entered by throwing a switch which generates an interrupt. If the test data is not stored automatically, it can be stored upon entering the test mode. When an interrupt is received from the radar system 14 or when the program loops in the test mode, the GET TARGET subroutine 64 is executed. After the target data has been obtained by polling the radar system or reading the test data, as described below, the target data is processed 66.

Figure 5:
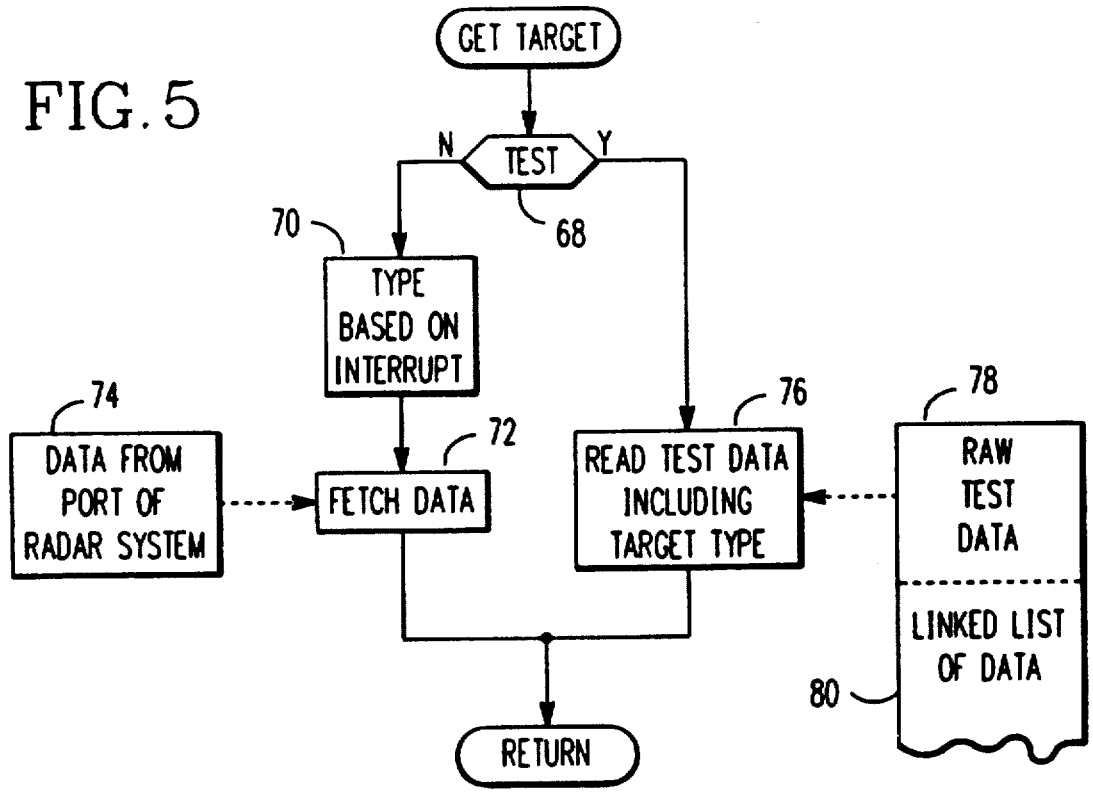
FIG. 5 is a block diagram of the GET TARGET function of the target correlator according to the present invention.

As illustrated in FIG. 5, the GET TARGET subroutine 64 isolates the instructions required for accessing the test data in the RAM 16 so that all of the instructions involved in processing 66 target data can be evaluated without regard to how the target data was obtained. A test mode bit, set upon entering test mode, indicates whether the target correlator is in the test mode. This test mode bit is checked 68 to determine which section of code in the GET TARGET routine should be executed. During normal operation, the type of data to be obtained is recorded 70 based on the interrupt received from the radar system 64. Instructions are then executed to fetch 72 data 74 from a port of the radar system 14. In the test mode, data is read 76 from the raw test and target identification data 78 stored, e.g., at the top of the RAM 16. As each item of data is read 76, the pointer to the next available item of test data is incremented until it reaches the end of the test data. The remainder of the RAM 16 is used to store a linked list of data 80 which is used by the target processing routines 66.

During development, the pipeline register and ROM unit 28 may use a microprocessor ROM emulator, such as a model DS370 from HI-LEVEL Technology, Inc. in St. Claire, Calif., in place of the ROM. The ROM emulator provides test data formation means enabling the test data previously described as being stored in ROM to be modified from one test run to another without the creation of a new ROM. Thus the test data and program can be modified quickly and easily to evaluate and correct specific portions of an algorithm.

In addition to the advantages discussed above, providing test data to a bit-slice microprocessor according to the present invention enables tests to be run at high speed. Bit-slice microprocessors used in a real-time environment will receive data at a speed dependent upon the source of data. In the case of a target correlator, the speed with which input data is received will depend upon the pulse repetition rate of the radar system 14. In test mode according to the present invention, data can be read at the speed of the microprocessor and captured by a logic analyzer. This enables tests to be run at high speed with results easily recorded and analyzed.

The many features and advantages of the present invention are apparent from the detailed specification, and thus it is intended by the appended claims to cover all such features and advantages of the testing system which fall within the true spirit and scope of the invention. Further, since numerous modifications and changes will readily occur to those skilled in the art from the disclosure of this invention, it is not desired to limit the invention to the exact construction and operation illustrated and described, accordingly, suitable modifications and equivalents may be resorted to, all falling within the scope and spirit of the invention.

APPENDIX A

| | | |
|---|---|---|
| MOVIR | REGISTER1 | ; move immediate into register #1 |
| IMDATA | TESTDATA1 | ; the fixed piece of data, testdata1 |
| MOVIR | REGISTER2 | ; move immediate into register #2 |
| IMDATA | TESTDATA2 | ; the fixed piece of data, testdata2 |

APPENDIX A -continued

| | | |
|---|---|---|
| MOVIR | REGISTER3 | ; move immediate into register #3 |
| IMDATA | TESTDATA3 | ; the fixed piece of data, testdata3 |
| MOVIR | REGISTER4 | ; move immediate into register #4 |
| IMDATA | TESTDATA4 | ; the fixed piece of data, testdata4 |
| . | | |
| MOVIR | REGISTERn | ; move immediate into register #n |
| IMDATA | TESTDATAn | ; the fixed piece of data, testdatan |

APPENDIX B

| | | |
|---|---|---|
| SUBRIA | TARGETPOINTER | ; test pointer for target 1<br>; subtract from RAM, the<br>; immediate value following,<br>; place it in accumulator |
| IMDATA | H#0001 | ; HEX/DECIMAL 1 |
| JMPZS | TARGET1 | ; IF RESULT WAS ZERO<br>; (TARGETPOINTER = 1)<br>; EXECUTE<br>; TARGET #1<br>; INSTRUCTIONS |
| SUBRIA | TARGETPOINTER | ; test pointer for target 2<br>; subtract from RAM, the<br>; immediate value following,<br>; place it in accumulator |
| IMDATA | H#0002 | ; HEX/DECIMAL 2 |
| JMPZS | TARGET2 | ; IF RESULT WAS ZERO<br>; (TARGETPOINTER = 2)<br>; EXECUTE<br>; TARGET #2<br>; INSTRUCTIONS |
| RET | | ; RETURN, OUTSIDE<br>; OF RANGE |
| TARGET1: | | ; unique code for target 1 |
| MOVIR | REGISTER1 | ; move immediate into register # |
| IMDATA | TESTDATA1 | ; the fixed piece of data, testdata 1 |
| MOVIR | REGISTER2 | ; move immediate into register #2 |
| IMDATA | TESTDATA2 | ; the fixed piece of data, testdata 2 |
| MOVIR | REGISTER3 | ; move immediate into register #3 |
| IMDATA | TESTDATA3 | ; the fixed piece of data, testdata 3 |
| MOVIR | REGISTER4 | ; move immediate into register #4 |
| IMDATA | TESTDATA4 | ; the fixed piece of data, testdata 4 |
| RET | | ; DONE WITH TARGET |

APPENDIX C

| | | |
|---|---|---|
| TARGETBLOCK: | | |
| TESTDATA | #1 | ; DATA FOR TARGET 1, WORD 1 |
| TESTDATA | #2 | ; DATA FOR TARGET 1, WORD 2 |
| TESTDATA | #3 | ; DATA FOR TARGET 1, WORD 3 |
| TESTDATA | #4 | ; DATA FOR TARGET 1, WORD 4 |
| TESTDATA | #5 | ; DATA FOR TARGET 1, WORD 5 |
| TESTDATA | #6 | ; DATA FOR TARGET 2, WORD 1 |
| TESTDATA | #7 | ; DATA FOR TARGET 2, WORD 2 |
| TESTDATA | #8 | ; DATA FOR TARGET 2, WORD 3 |
| TESTDATA | #9 | ; DATA FOR TARGET 2, WORD 4 |
| . | | |
| RETURN | | ; DONE |

What is claimed is:

1. A method of providing test data for a processing system, having an arithmetic/logic unit and a sequence control unit, executing a program stored in a read only memory and storing data in a random access memory, said method comprising the steps of:
 (a) storing test data as instructions for the arithmetic/logic unit in the program stored in the read only memory;

(b) sequentially reading the instructions stored in step (a) while the arithmetic/logic unit is prevented from acting on the instructions;

(c) sequentially storing the test data in the random access memory as the instructions are read in step (b); and (d) accessing the test data in the random access memory in place of receiving operational data when the processing system is in a test mode.

2. A method as recited in claim 1, wherein the arithmetic/logic unit has an instruction input for receiving instructions from the read only memory and a data output for outputting data and the random accesss memory has a data input, operatively connected to the data output of the arithmetic/logic unit, for receiving data to be written in the random access memory, and wherein said method further comprises the step of (e) providing a data transfer path from the instruction input of the arithmetic/logic unit to the data input of the random access memory, prior to performing step (b).

3. A method as recited in claim 1, wherein the processing system is interfaced with an external system to transmit and receive data, wherein said storing in step (a) further comprises storing memory access instructions in a subroutine, executed only in the test mode to perform said accessing in step (d) and storing simulation instructions for simulating interaction with the external system in the test mode, and further comprising the step of (e) executing the simulation instructions in the test mode.

4. A method as recited in claim 1, said reading in step (b) comprises the steps of:
(b1) disabling the arithmetic/logic unit; and
(b2) initiating a sequence of the instructions in the program stored in the read only memory, containing the test data, under control of the sequence control unit, until an enabling instruction is read indicating nd of the test data, and wherein said writing in step (c) comprises the steps of:
(c1) loading a counter with an address for starting storage of the test data in the random access memory, prior to performing step (b1);
(c2) transferring the instructions from the read only memory to the random access memory;
(c3) writing the test data in the random access memory at the address indicated in the counter;
(c4) incrementing the counter after the test data in each instruction is written in the random access memory;
(c5) repeating steps (c2)-(c4) until the enabling instruction is read; and
(c6) enabling the arithmetic/logic unit when the enabling instruction is read.

5. A method as recited in claim 4, wherein the processing system is interfaced with an external system to transmit and receive data, wherein said storing in step (a) further comprises storing memory access instructions in a subroutine, executed only in the test mode to perform said accessing in step (d) and storing simulation instructions for simulating interaction with the external system in the test mode, and further comprising the step of (e) executing the simulation instructions in the test mode.

6. An apparatus for testing a processing system, having an arithmetic/logic unit and a sequence control unit, executing a program stored in a read only memory and storing data in a random access memory, said apparatus comprising:

test data formation means for storing the program, including test data contained in instructions, in the read only memory; and test data transfer means for reading the instructions containing the test data while the arithmetic/logic unit is prevented from receiving the instructions and for storing the test data in the random access memory to provide access to the test data in place of operational data when the processing system is in a test mode.

7. An apparatus as recited in claim 6, wherein said test data transfer means comprises a data path connected between the read only memory and the random access memory.

8. A microprocessor system interfaced to an external system, comprising:

a bit-slice microprocessor operatively connected to the external system;

a read only memory, operatively connected to said bit-slice microprocessor, for storing an execution sequence indication, microcode words, each microcode word containing a microprocessor instruction, and control bits for generating control signals for controlling the microprocessor system and system signals supplied to the external system, the microcode words including a sequence of test data words each containing test data in the microprocessor instruction and a first control bit set to disable the bit-slice microprocessor;

a pipeline register for receiving at least a portion of the control bits of each microcode word read from the read only memory;

a microprogram sequencer, operatively connected to said bit-slice microprocessor and said read only memory, for controlling execution of the microcode words stored in said read only memory in dependence upon the execution sequence indication, the execution sequence indication in the sequence of test data words causing said microprogram sequencer to sequentially read the microcode words in the sequence of test data words;

a presettable counter, operatively connected to said bit-slice microprocessor and said pipeline register, for incrementing, under control of a second control bit stored in said pipeline register, an address received from said bit-slice microprocessor;

a write control circuit, operatively connected to said pipeline register, for generating a write control signal in dependence upon a third control bit stored in said pipeline register; and a random access memory having a control input operatively connected to said write control circuit, an address input operatively connected to said presettable counter and a data input operatively connected to said bit-slice microprocessor and said read only memory, for writing and reading data from and to said bit-slice microprocessor when enabled and writing the test data output from the read only memory when the sequence of test data words is read from the read only memory by said microprogram sequencer.

9. A microprocessor system as recited in claim 8, wherein the external system includes components of a radar system, and
   wherein said bit-slice processor performs target correlation under control of the microcode words stored in the read only memory.

10. A method of providing test data for a processing system, having an arithmetic/logic unit and a sequence control unit, executing a program stored in a read only memory emulator and storing data in a random access memory, said method comprising the steps of:
   (a) storing test data as instructions for the arithmetic/logic unit in the program stored in the read only memory;
   (b) sequentially reading the instructions stored in step (a) while the arithmetic/logic unit is prevented from acting on the instructions;
   (c) sequentially storing the test data in the random access memory as the instructions are read in step (b);
   (d) accessing the test data in the random access memory in place of receiving operational data when the processing system is in a test mode; and
   (e) wherein the program stored in the read only memory emulator is modified in dependence upon testing performed by executing steps (a)–(d).

11. An apparatus for testing a processing system, having an arithmetic/logic unit and a sequence control unit, executing a program stored in a rad only memory emulator and storing data in a random access memory, said apparatus comprising:
   test data formation means for storing the program, including test data contained in instructions, in the read only memory emulator; and
   test data transfer means for reading the instructions containing the test data while the arithmetic/logic unit is prevented from receiving the instructions and for storing the test data in the random access memory to provide access to the test data in place of operational data when the processing system is in a test mode.

* * * * *